(No Model.)
J. J. SADLER.
HORIZONTAL GUIDE FOR SAWS.
No. 277,351. Patented May 8, 1883.
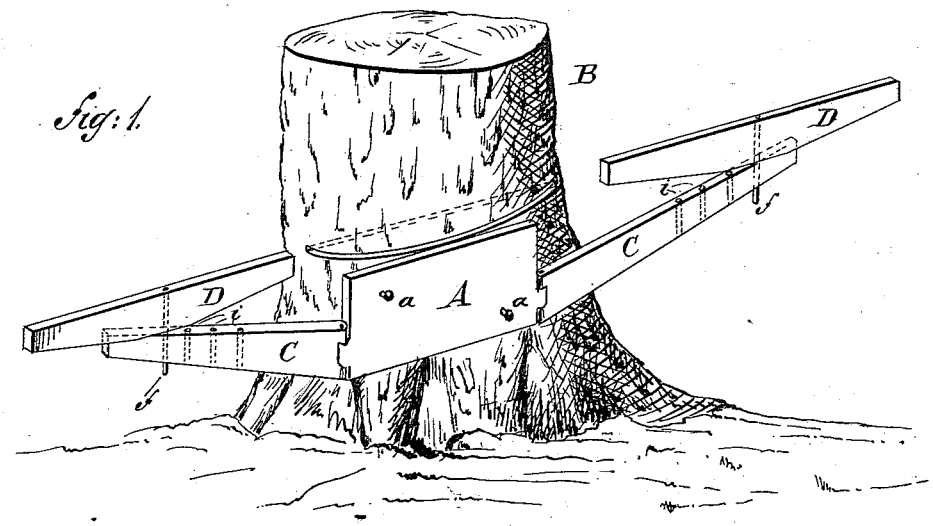
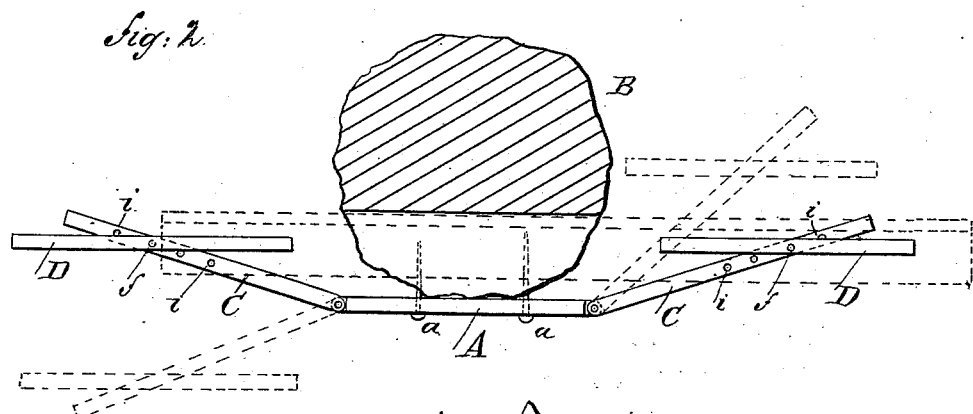
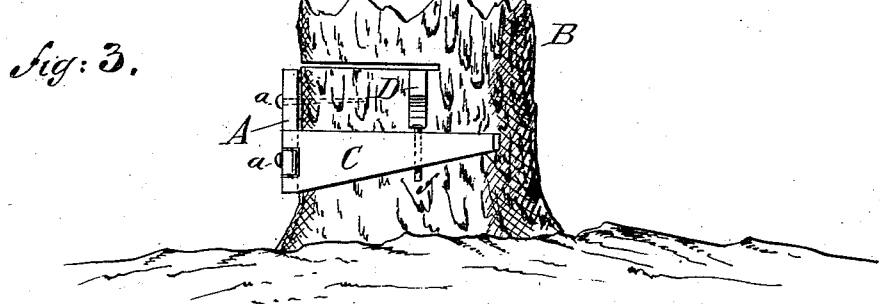
WITNESSES:
Chas. Nida
C. Sedgwick
INVENTOR:
J. J. Sadler
BY Munn & Co.
ATTORNEYS.

UNITED STATES PATENT OFFICE.

JAMES J. SADLER, OF McBRIDE'S, MICHIGAN.

HORIZONTAL GUIDE FOR SAWS.

SPECIFICATION forming part of Letters Patent No. 277,351, dated May 8, 1883.

Application filed February 17, 1883. (No model.)

*To all whom it may concern:*

Be it known that I, JAMES J. SADLER, of McBride's, Montcalm county, Michigan, have invented a new and Improved Horizontal Guide for Crosscut-Saws, of which the following is a full, clear, and exact description.

My invention seeks to provide a device adapted to be attached to standing trees or stumps for guiding a crosscut-saw in cutting the tree down or cutting the stump off close to the ground; and to this end my invention consists of a main center board adapted to be spiked to the body of the tree or stump to be cut, of two arms hinged to the ends of the center board, and of two guide-pieces pivoted upon the hinged arms, all as hereinafter more fully described and claimed.

Reference is to be had to the accompanying drawings, forming part of this specification, in which similar letters of reference indicate corresponding parts in all the figures.

Figure 1 is a perspective of my invention as it appears when attached to a stump, ready for use. Fig. 2 is a plan view of the same; and Fig. 3 is a side elevation, showing my invention applied to the trunk of a tree, ready for use.

A represents the main center board of the guide, which board is adapted to be spiked to the tree or stump B by the spikes *a a*.

C C represent the side arms, hinged to the ends of the center board, A, and these arms are about one-half the width of the board A, as shown in Figs. 1 and 2; and D D represent the guide-boards, that are pivoted upon the arms C C by the rods or pins *f f*, that pass down through one or other of the series of holes *i i*, made in the arms C C, and the upper edges of these guide-boards D stand in the same plane with the upper edge of the center board, A, as clearly shown in the drawings.

In use the device is first to be spiked, in proper position, to the body of the tree or stump to be cut, and the arms C C are to be swung backward away from the body of the tree or stump, so as to hold the guides D D in position for supporting and guiding the saw in starting. The saw having been well started, the arms C C will be swung gradually forward toward the body of the tree or stump as the sawing continues, so that the guides D D will continue to support and guide the saw until the tree or stump is sawed entirely off. In this manner it will be seen that no difficulty will be experienced in starting the saw or in causing it to make a straight cut, and will thus be a great relief to the persons sawing, since they will not need to give the saw any special attention.

By means of the series of holes *i* in the hinged arms C C the guides D D may be placed near to or farther away from the ends of the center board, A, according to the size of the tree or stump to be cut, so that the device is adapted to be attached to trees or stumps of all sizes.

By making the side arms, C C, as wide as the center board, A, or hinging them thereto in such manner that their upper edges will stand on the same plane with the upper edge of the board A, the guide-pieces D D might be dispensed with, since the arms could be turned away from and toward the stump or tree, and thus guide and support the saw.

In case of very large stumps and trees the two wings C C may both be also bolted to the stump or tree, and two additional wings may be attached to them, nearly opposite the center of the stump or tree, that will turn freely in either direction for supporting the saw-guides D D.

Having thus described my invention, I claim as new and desire to secure by Letters Patent—

1. The guide herein shown and described, consisting of the center board, A, arms C C, hinged thereto, and the pivoted guides D D, substantially as and for the purposes set forth.

2. The arms C C, hinged to the board A, and formed with the series of holes *i*, in combination with the guides D D, adapted to be pivoted in the said holes, substantially as and for the purposes set forth.

JAMES J. SADLER.

Witnesses:
M. C. PALMER,
H. N. TURNER.